United States Patent [19]

Raybon

[11] Patent Number: 4,774,033
[45] Date of Patent: Sep. 27, 1988

[54] GAS LIQUID TOWER STRUCTURE

[75] Inventor: Charles L. Raybon, Riverside, Calif.

[73] Assignee: Energair Research and Development, Las Vegas, Nev.

[21] Appl. No.: 133,140

[22] Filed: Dec. 14, 1987

Related U.S. Application Data

[62] Division of Ser. No. 27,015, Mar. 17, 1987.

[51] Int. Cl.[4] .............................................. B01F 3/04
[52] U.S. Cl. ................................... 261/109; 261/110; 261/112
[58] Field of Search ............. 261/108, 109, 110, 112.2

[56] References Cited

U.S. PATENT DOCUMENTS

| | | | |
|---|---|---|---|
| 265,974 | 10/1882 | Nichols | 261/112.1 |
| 582,691 | 5/1897 | Kennedy . | |
| 594,440 | 11/1897 | Stocker et al. | 261/108 |
| 877,460 | 1/1908 | Brunner et al. | 261/109 |
| 943,422 | 12/1909 | Knoepfel . | |
| 1,647,281 | 11/1927 | Doyle . | |
| 1,866,193 | 7/1932 | Coutant | 55/241 |
| 2,050,160 | 8/1936 | Corner et al. . | |
| 2,394,133 | 2/1946 | Zimmerman | 261/110 |
| 2,681,269 | 6/1954 | Bergstrom | 261/109 |
| 2,858,119 | 10/1958 | Wright et al. | 261/109 |
| 3,006,623 | 10/1961 | Ross et al. . | |

(List continued on next page.)

FOREIGN PATENT DOCUMENTS

| | | | |
|---|---|---|---|
| 537474 | 5/1955 | Belgium | 261/121.1 |
| 1327892 | 4/1963 | France | 261/112.2 |
| 2001539 | 7/1971 | France | 261/112.2 |
| 251682 | 5/1926 | United Kingdom | 55/234 |
| 360366 | 11/1931 | United Kingdom | 55/241 |
| 457974 | 12/1936 | United Kingdom | 55/241 |

OTHER PUBLICATIONS

Cooling Tower Engineering Manual, pp. 3-6, 9/64, Baltimore Aircoil Co., Inc., Baltimore, MD, Bulletin 241.

Fluidkooler Brochure, pp. 3, 4 and 10, No Date, Marley Cooling Tower Co., Shawnee Mission, KA.
Evapco Cooling Towers Bulletin 301A, p. 6, 1980, Evapco Inc., Baltimore, MD.
The Marley Cooling Tower Company, 5800 Foxridge Drive, Mission, Kansas, Schematics and Descriptions, pp. 6, 7.

Primary Examiner—Tim Miles
Attorney, Agent, or Firm—Sheldon & Mak

[57] ABSTRACT

A tower structure for gas-liquid interaction produces rolling turbulence in a gas flow path that has low pressure drop. The structure includes a spaced plurality of vertically disposed wall members in an upwardly directed flow path, a staggered array of horizontally extending deflectors protruding from facing wall members, forming a series of converging and diverging chamber portions in which the gas flows generally perpendicular to the deflectors. Rolling turbulence is produced between apexes of the deflectors and the facing wall portions, the gas flow being offset toward opposite wall members at succeeding apexes. In one configuration, a liquid is transported within the gas flow, in contact with the gas. In another configuration, the liquid is separate from the gas. In a further configuration, two liquid paths are provided, one in contact with the gas, one separate from the gas. In the configurations transporting a liquid not in contact with the gas, the deflector members are hollow for passing the liquid in close proximity to the gas. A supply manifold delivers the liquid into the uppermost deflector member, the liquid flowing between opposite side members of the wall members into each of the deflector members of a wall member, exiting from the lowermost deflector member of the wall member, being collected therefrom by an outlet manifold for recirculation. The structure provides a variety of cooling tower, condensing tower, heat exchanger, and scrubber configurations, alone and in combination, in a family of compatible modules.

30 Claims, 6 Drawing Sheets

U.S. PATENT DOCUMENTS

| | | |
|---|---|---|
| 3,132,190 | 5/1964 | Engalitcheff, Jr. |
| 3,195,987 | 7/1965 | Hardison ................... 261/DIG. 72 |
| 3,290,867 | 12/1966 | Jacir ................................ 261/109 |
| 3,378,239 | 4/1968 | Engalitcheff, Jr. et al. |
| 3,456,709 | 7/1968 | Vegeby |
| 3,466,019 | 9/1969 | Priestley ......................... 261/112.2 |
| 3,707,277 | 12/1972 | Phelps |
| 3,726,064 | 4/1973 | Rowley |
| 3,799,512 | 3/1974 | Raybon |
| 4,096,214 | 6/1978 | Percevant et al. ............ 261/112.2 |
| 4,218,408 | 8/1980 | Henning et al. |
| 4,272,371 | 6/1981 | Moses et al. ................... 261/112.2 |
| 4,333,749 | 6/1982 | Holmberg et al. |
| 4,361,426 | 11/1982 | Carter et al. ................... 261/112.2 |
| 4,374,542 | 2/1983 | Bradley ........................... 261/112.1 |
| 4,434,112 | 2/1984 | Pollock ............................ 261/153 |
| 4,548,766 | 10/1985 | Kinney, Jr. et al. ............ 261/112.2 |
| 4,592,877 | 6/1986 | Phelps ............................. 261/109 |

GAS LIQUID TOWER STRUCTURE

This is a division of application Ser. No. 027,015, filed Mar. 17, 1987.

BACKGROUND

The present invention relates to gas liquid tower structures, including cooling towers, scrubbers, heat exchangers, condensers, chemical process towers and the like.

One aspect of the present invention relates to gas liquid contact apparatus wherein a large surface area of the liquid is presented for direct contact with the gas for mixing therewith, thereby cooling either the liquid or the gas, changing the moisture content of the gas, removing impurities from the gas, etc.

In gas liquid contact apparatus of the prior art, the liquid is distributed by spray nozzles or channels into a chamber which may be open or have fill therein for retarding the flow of the liquid and enhancing the contact between the gas and the liquid.

Another aspect of the present invention relates to structures for gas liquid interaction wherein the liquid is maintained separate from the gas, as in heat exchangers and condensers. In these structures, a heat exchanger medium having high thermal conductivity is interposed between the liquid and the gas. Typically, the liquid is fed through a metal conduit that is exposed to the gas, the conduit being commonly equipped with fins or the like for presenting a large surface area of heat exchange medium to the gas.

It is also often required or desirable for there to be at least two liquid transport systems in the apparatus, a first liquid contacting the gas and a second liquid, which may include a portion a gaseous phase, separated from the gas, heat being transferred between the gas and the second liquid for heating or cooling the second liquid.

Many tower structures of the prior art are undesirably large, heavy, expensive to build, transport and operate in relation to the output capacity thereof, for at least some of the following reasons:

1. They have a large complex fill structure that includes many complicated parts that require a great quantity of material and are difficult to assemble.
2. They produce an uneven distribution of gas flow caused by "channeling" wherein gas flow stagnates in regions of high droplet concentration and/or unequal pressure distribution in parallel gas paths.
3. They have uneven distribution of liquid flow caused by clogging, poor dimensional control of liquid passages, and/or series pressure drops between parallel-connected orifices.
4. They produce poor mixing resulting from large liquid droplet sizes and/or low levels of turbulence of the gas and/or the liquid.
5. They have high blower or fan power requirements caused by restrictions to gas flow.
6. They utilize structural components that are unsuitable for variant tower configurations, resulting in high-setup and/or inventory costs.

Thus there is a need for a tower structure that provides a compact, light weight tower apparatus for gas liquid interaction that is inexpensive to build, transport, and upright, and is easy to use.

SUMMARY

The present invention is directed to a tower structure that meets this need by producing a desired level of rolling turbulence in a gas flow path that has low pressure drop. In one configuration, the structure includes a plurality of spaced parallel wall members in a chamber, a staggered array of parallel deflector members protruding from facing wall members for producing the rolling turbulence. The space between the facing wall members is in the form of a series of converging and diverging chamber portions wherein the gas flows generally perpendicular to the deflectors. A diverging chamber portion has an inlet that is offset laterally toward one of the wall members, and a converging chamber portion that is fed directly by the diverging chamber portion has an outlet that is offset laterally toward the other wall member. The structure also includes means for transporting a fluid through the chamber for interaction with the gas. The deflector members can preferably have a first surface for forming one side of a converging chamber portion and a second surface for forming one side of a diverging chamber portion, the first and second surfaces joining at a deflector apex having an included angle within the deflector member of less than 180°. Preferably the included angle is between about 60° and about 135° for providing an advantageous combination of high turbulence and low pressure drop. More preferably, the angle is about 90°.

The deflector members can be polygonal in crosssection, one side being coplanar with this wall member. In a preferred configuration, the deflector members are triangular, with two sides extending and forming the first and second surfaces. The apex of one deflector member can be located approximately opposite the intersection of the first surface and the wall member segment of a facing deflector member.

At least some of the deflector members can be hollow for transporting the fluid, which is normally a liquid, but which can have a portion of gaseous phase, in close proximity to the gas without contacting the gas, the conducting heat between the gas and the fluid. Thus, depending on operating conditions, the fluid can be either heated or cooled by the gas. Preferably a wall member of the structure includes spaced side members forming a cavity in communication with at least two hollow deflector members for permitting the fluid flow within the wall member between the deflector members. Thus there is no requirement for a bulky liquid interconnection system at the ends of the deflector members. Instead, liquid conduits can be connected to the deflector members upstream and downstream of the wall members for providing an efficient, compact tower structure. In this configuration, it is preferred that the hollow deflector members be formed as part of a corresponding side member of its wall member. Thus the single pair of the side members forms a wall member together with its compliment of deflector members, including the cavity for feeding the fluid between the deflector members. This configuration provides a further advantage in that essentially all of the side member area is in direct contact with the gas on one side and the liquid on the other for efficient heat transfer between the gas and the liquid.

The structure can have spacing means between facing wall members for preventing separation of the side members under liquid pressure within the wall members. The spacer means can be a plurality of parallel web members positioned perpendicular to the wall members and the deflector members. The web members can provide enhanced heat conduction between the liquid and the gas by presenting additional surface area to the gas and a low thermal resistance to at least one of the wall side members.

In another configuration of the present invention, a first liquid passes between the wall members for contacting the gas, advantageously combining high turbulence of the liquid for effective mixing and low pressure drop in the gas. The wall members are preferably vertical, the structure being adapted for upward gas flow between the wall members, and the liquid is introduced proximate the tops of the wall members for downward flow toward the bottoms of the wall members. The upward gas flow impedes the downward progress of the liquid, inducing a high level of rolling turbulence in the liquid for mixing with the gas. In this configuration, the web members, in addition to spacing the wall members, prevent lateral migration of the gas between the wall members. This avoids "channeling" wherein the gas, seeking a path of least resistance is blocked by the liquid in regions of slightly increased gas flow resistance, a large proportion of the gas moving freely in the other regions, depleting the liquid concentration in those regions.

In another important configuration of the present invention, each wall member has alternating horizontally extending segments that are inclined on opposite sides of vertical, parallel with corresponding segments of facing wall members, and with the deflector members at junctions of the segments and having front and back sides, the front sides including the first and second surfaces, the back sides forming concave transition surfaces between adjacent segments of the wall members. The first surfaces of each deflector member can be concavely curved, the second surface being a planar extension of the wall member segment to which it is joined. Also, the diverging chamber portions can be formed between the second surfaces and the transition surfaces of facing deflector members.

In this configuration, the transition surfaces of the deflector members preferably have a radius of curvature approximately equal to the distance between the adjoining segments and the corresponding segments of the facing wall member. This conveniently and effectively provides a smoothly expanding path for the gas in the diverging chamber portions. Preferably the transition surface of one deflector directly connects the first surface of the deflector on an adjacent wall member segment, so that the gas flows directly from a diverging chamber portion into the next succeeding converging chamber portion. This advantageously provides a very compact arrangement wherein a large number of the deflector members are in a small volume of the chamber for effective gas liquid interaction with minimal resistance to gas flow.

In a further configuration, the first liquid can pass between the wall members for contacting the gas, and another fluid, normally a liquid, but which may have a portion of gaseous phase, circulates through the hollow deflector members for interaction with the gas without contacting the gas as described above. In this configuration, the structure can have a chamber with an inlet for the gas and an outlet for the gas above the inlet, a parallel vertically disposed spaced plurality of wall members in the chamber with a staggered array of horizontally extending deflector members protruding therefrom for producing rolling turbulence in the gas, means for transporting a first liquid downwardly between the wall members for contacting the gas, the deflector members being hollow for transporting a second liquid proximate the gas but not in contact with the gas for heat transfer between the gas and the second liquid. The transporting means, which is equipped with the means for distributing a sheet of liquid onto the wall member from manifold means as described above, preferably incorporates a parallel grid structure of the manifold means for evenly distributing a first liquid along the length of the wall members.

The present invention provides a tower structure that has improved performance for a given size of structure. Conversely, for a given level of performance, a smaller structure is possible. This results in reduced costs for fabricating, shipping, and providing an installation environment for the tower. Moreover, a family of structures suitable for many different applications can be based on a limited variety of component parts.

DRAWINGS

These and other features, aspects, and advantages of the present invention will become better understood with reference to the following description, appended claims, and accompanying drawings where:

FIG. 2 is a fragmentary perspective elevational view of the structure of FIG. 1 within region 2 of FIG. 1;

FIG. 7 is a sectional elevational diagram as in FIG. 5 showing a further alternative configuration of the structure of FIG. 1;

DESCRIPTION

Figure 1:
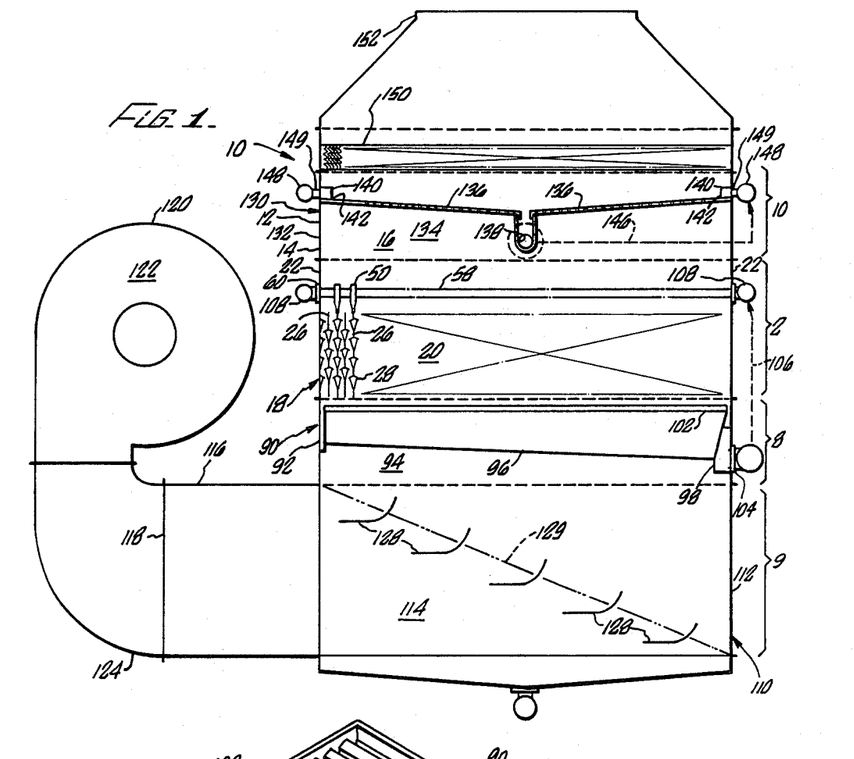
FIG. 1 is a fragmentary sectional elevational view of a gas liquid tower structure according to the present invention.
Figures 1, 3, 4, 5, 6:
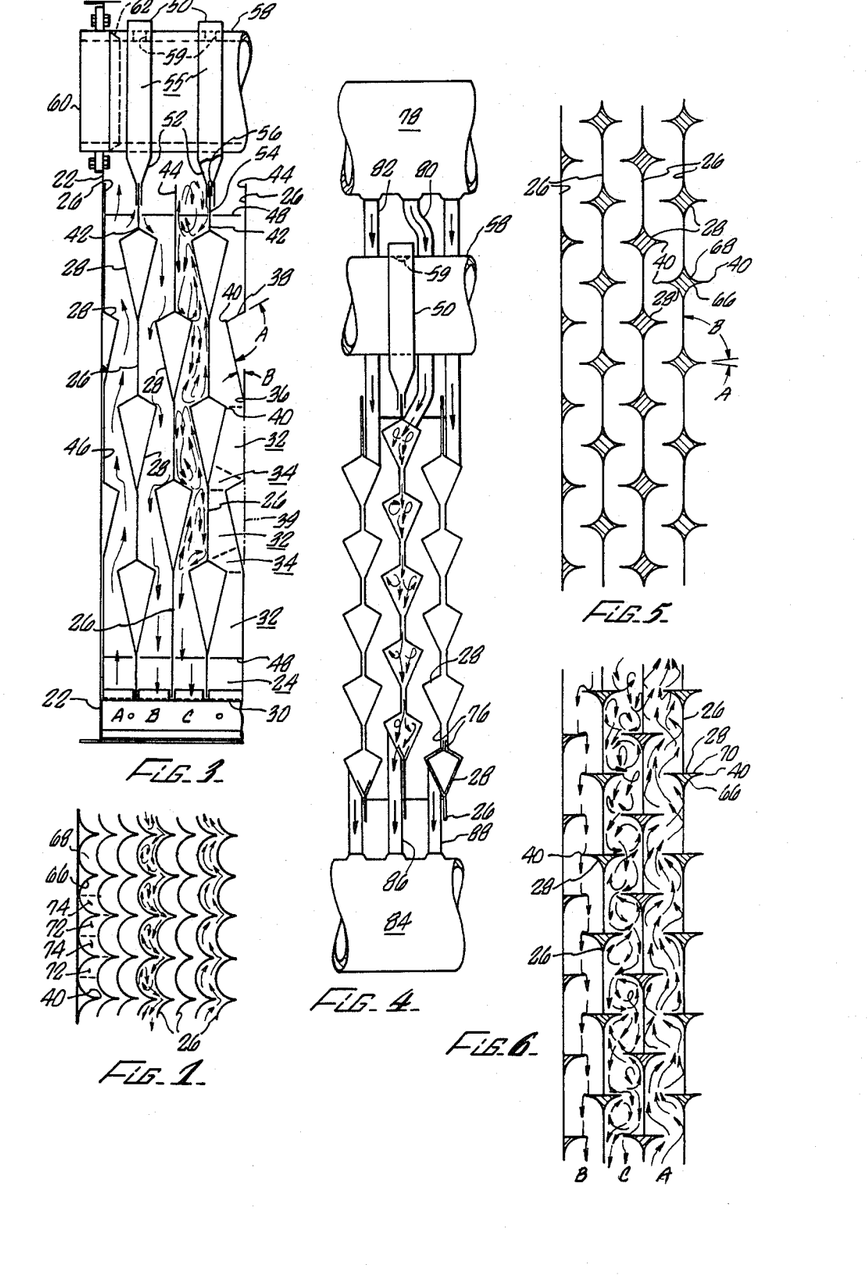
FIG. 3 is a fragmentary sectional elevational view of the structure of FIG. 1 on line 3—3 of FIG. 2.
FIG. 4 is a fragmentary sectional elevational view as in FIG. 3 showing an alternative configuration of the structure of FIG. 1.
FIG. 5 is a sectional elevational diagram corresponding to FIG. 3 showing another alternative configuration of the structure of FIG. 1.
FIG. 6 is a sectional elevational diagram as in FIG. 5 showing another alternative configuration of the structure of FIG. 1.

The present invention is directed to a versatile gas liquid tower structure that provides significant advantages in a variety of system configurations. With reference to FIGS. 1-3, a tower structure 10 includes a modular, segmented housing 12 having opposite side walls 14 and end walls 16. The gas flows within the housing 12 for interaction with at least one other fluid which is normally a liquid but can include a second gas. A principal feature of the present invention is a gas liquid interaction unit 18, forming an interaction chamber 20 in a segment of the housing 12. The interaction chamber 20 is open at its top and bottom, having opposite side segments 22 and end segments 24 that form corresponding portions of the side walls 14 and the end walls 16. The interaction unit 18 includes a spaced parallel array of wall members 26, the wall members 26 having deflector members 28 thereon for producing a desired degree of turbulence in a flow of gas within the interaction chamber 20. More importantly, the combination of the wall members 26 and the deflector members 28 provide a high degree of turbulence in a liquid that is introduced between the wall members 26 as further described below.

The wall members 26 are oriented vertically, being uniformly spaced between the side segments 22, and extending between the end segments 24. The deflector members 28 form a staggered array on the wall members 26, each deflector member 26 extending horizontally between the end segments 24. The bottoms of the wall members 26 are supported and spaced apart by a pair of horizontally disposed Z-shaped members 30, each Z-shaped member 30 being fastened to one of the end segments 24 proximate the bottom thereof, opposite ends of the Z-shaped members 30 extending to the respective side segments 22.

The structure 10 is adapted for moving the gas generally upwardly in the housing 12, the bottom of the interaction unit 13 functioning as a chamber entrance and the top of the interaction unit functioning as a chamber exit for the gas. Essentially all of the gas passes through the chamber 20 between the wall members 26 generally perpendicular to the deflector members 28. As most clearly shown in FIG. 3, the wall members 26, together with the deflector members 28, form a series of converging chamber portions 32 and diverging chamber portions 34. The deflector members 28 are typically polygonal in cross-section, with one side lying in the plane of the associated wall member 26. Thus one side of the polygonal cross-section of a deflector member 28 can be considered as a segment 39 of the associated wall member 26 from which the deflector member 28 extends. It should be understood that the general configuration of the wall members 26 (without the deflection members 28) can be other than planar. They can be generally curved vertically, horizontally, or both, as long as the area perpendicular to the flow of gas between each pair of facing wall members, not including the deflector members, in a gross sense, is substantially uniform from the bottom to the top of the wall members. This is because the average gas flow velocity in each series pair of the chamber portions 32 and 34 should be uniform for effective utilization of each of the deflector members 28 in the gas liquid interaction.

In the configuration shown in FIG. 3, the deflector members 28 are triangular in cross-section, one side thereof extending upwardly and outwardly from the wall member 26, forming a first surface 36. Another side of the deflector member 28 extends downwardly and outwardly from the wall member 26, forming a second surface 38, the second surface 38 intersecting the first surface 36 at an apex 40, forming an apex angle A that is less than 180°. The first surface 36 also forms an angle B with the wall member 26, the angle B representing the deviation from an upward extension of the wall member 26 below the first surface 36. Typically, angle B is about one-third the magnitude of angle A for causing a high level of turbulence proximate the apex A while producing minimal resistance to gas flow. The segment 39 forms the third side of the triangular cross-section. It should be understood that although the segment 39 is shown aligned with the wall member 26 below the first surface 36 of the deflector member 28, it is not required to be. A different relationship is produced when the wall member 26 is curved or segmented, as described above.

The staggered array of the deflector members 28 is obtained by having the wall members 26 in two configurations, a first configuration 42 having uppermost deflector members 28 on opposite sides thereof, the uppermost deflector members 28 being located vertically above the highest deflector members 28 of the wall members 26 of a second configuration 44. the wall members 26 of the second configuration 44 also have deflector members 28 on opposite sides thereof, except that a pair of outside wall members 46 of the second configuration 44, having deflector members 28 on one side only, extend upwardly from the Z-shaped members 30 in contact with the side segments 22 of the interaction unit 18. Although any number of the deflector members 28 can be located on one side of a wall member 26, it is generally preferred that there be several of the deflector members 28, spaced at uniform intervals in the direction of gas flow. Thus, as shown in FIG. 3, there are three of the deflector members 28 on each side of the wall members 26 of the first configuration 42. Also, there are two of the deflector members 28 on each side of the wall members 26 of the second configuration 44. A plurality of wall spacers or web members 48 are interposed between the wall members 26 at spaced intervals for holding the wall members 26 in spaced alignment, and for other purposes described below.

Preferably the apex 40 of a deflector member 28 is located proximate the intersection of the first surface 36 and the wall member segment 39 of a facing wall member 26, when the wall members 26 having the configuration shown in FIG. 3. Thus the converging chamber portions 32, formed between the first surface 36 and a facing wall member 26, extend upwardly to the apex 40, the space between the apex 40 and the facing wall members functioning as an outlet of the converging chamber portion 32 and a inlet of an adjacent diverging chamber portion 34, the diverging chamber portion 34 being formed between the second surface 38 above the apex 40 and the lower portion of the first surface of a facing deflector member 28. The diverging chamber portion 34 feeds another of the converging chamber portions 32, the space between the wall members 26 and the apex 40 of the deflector member 28 on the facing wall member 26 functioning as another of the outlets, the outlets being alternately displaced toward opposite sides of the chamber portions 32 and 34. Thus the converging and diverging chamber portions 32 and 34 of the present invention advantageously provide a rolling gas turbulence with minimal restriction to the flow of gas. This is because the staggered arrangement of the converging and diverging chamber portions produces a rolling turbulence, alternately rotating in opposite directions on opposite sides of each apex 40. This characteristic of the gas flow pattern is particularly advantageous in gas fluid contact interaction applications, further described herein.

As also shown in FIG. 3, a conduit 50 is connected to each of the wall members 26 of the first configuration 42 for introducing a liquid to be transported within the interaction unit 18 in contact with the gas. Each conduit 50, as a lower part thereof, includes a V-shaped member 52 located proximate the tops of the wall members 26, the V-shaped members 52 including a slot 54 at the bottom thereof, the slot 54 extending substantially the entire length of the associated wall member 26 for producing a sheet of the liquid along each side of the wall member 26, opposite sides of the slot 54 being spaced away from the wall member 26 by a predetermined distance for producing a corresponding thickness of the flowing sheet of liquid along the wall member 26. A plurality of spacer clips 56, extending from opposite sides of the slot 54 over the tops of the wall members 26, are spaced apart along the wall members 26 for maintaining a desired clearance for the liquid. The conduits 50 extend upwardly from the V-shaped portions 52, and are fed by a pair of tubular manifolds 58. The manifolds 58, protruding opposite sides of each conduit 50, extend across the interaction unit 18 to proximate the side segments 22. A plurality of flanged manifold fittings 60 is fastened to the outside of the interaction unit 18 for supporting both ends of each manifold 58, the fittings 60 having a cone-shaped extension 62 protruding the side segment 22 for supporting and connecting the manifolds 58.

As further shown in FIG. 3, the present invention provides a highly effective interaction between the liquid and the gas. The flow of the gas generally corresponds to the upwardly directed arrows above the designation A in the space adjacent the outside wall member 46, and is generally duplicated in the space between each of the facing pairs of the wall members 26. For clarity, the rollingly turbulent flow pattern of the gas above the designation A is simplified in the drawing for emphasizing the upward flow of the gas. Also, when the gas and the liquid flow in opposite directions between the wall members 26, each substantially impedes the flow of the other. Thus for a given power setting of a blower or other means for producing the gas flow, the gas flow rate increases when the liquid flow is stopped. Conversely, for a given gas flow rate corresponding to what is achieved during liquid flow, there is a reduced level of gas flow turbulence in the absence of the liquid.

In the absence of gas flow, the liquid follows generally the path of the downwardly directed arrows above the designation B in FIG. 3, flowing from the slot 54 of the conduit 50 on the surface of the wall member 26, downwardly and outwardly toward the apex 40 of the uppermost deflector member 28, falling in the space between the wall members 26 and impinging on the next highest deflector member 28 of the facing wall member 26. The liquid continues to fall from the apex of each succeeding deflector member 28 to the next lower deflector member on the opposite wall member 26, until the liquid falls to the bottom of the interaction unit 18. For this purpose, each deflector member 28 extends from its wall member 26 approximately half the spacing between the wall members 26. When there is both liquid and gas flow, a high level of rolling turbulence is induced in the liquid, the path of the liquid being generally as shown by the arrows above the designation C in FIG. 3. The liquid flows downwardly on the wall member 26 from the slot 54 to the apex 40 of the first deflector member 28 as described above. At this point, however, the liquid, encountering a relatively high velocity stream of the gas at the apex 40, is broken up into a very large multiplicity of tiny droplets and is carried upwardly in the gas stream, the deflector member 28 producing a high level of rolling turbulence in the liquid proximate the apex 40 such that the liquid droplets are thoroughly mixed with the gas, presenting a very large surface of the liquid to the gas. In the triangular configuration of the deflector members 28 shown in FIG. 3, the apex angle A is preferably between about 60° and about 135° for producing a violent encounter between the liquid falling from the deflector member 28 in line with the second surface 38, and the gas moving upwardly in substantially laminar flow along the first surface 36. more preferably, the angle A is about 90° for providing a maximum velocity difference between the liquid and the gas at the apex 40 without producing aerodynamic drag hindering the progress of the liquid downwardly on the second surface 38. This can be understood by considering the first surface 36 as shielding the liquid on the second surface 38 from high velocity gas flow. Thus the liquid flow is not impeded until it leaves the second surface 38 of the apex 40. In this preferred configuration, the angle B can be about 30°. Rolling turbulence in an opposite direction is also produced in the liquid below the apex 40, some of the liquid droplets being carried downwardly thereby toward the next lower apex 40.

Typically, the liquid droplets vary in size, the larger droplets being carried downwardly at least in part under the influence of gravity. These larger droplets impinge on the next lower deflector member 28, being broken up into smaller droplets as the liquid again encounters a relatively high velocity stream of the gas at the next lower apex 40. This process continues until any of the liquid that is not evaporated is either carried upwardly from the interaction unit in the form of very tiny droplets or it falls into the gas stream entering the interaction unit 18 from below. The turbulence in the liquid greatly reduces the rate of progress of the liquid downwardly toward the bottoms of the wall members 26, presenting the liquid in contact with the gas for a substantial period of time.

As thus described, the tower structure 10 of the present invention functions as a cooling tower, the gas cooling the liquid. A relatively high flow rate of the liquid is normally maintained, only a small part being evaporated in the gas. Accordingly, most of the liquid falls to the bottom of the interaction unit 18, having been cooled by contact with the gas and by the heat that is required to vaporize the rest of the liquid. When it is desired to cool the gas, a relatively lower flow rate of a cool liquid is typically maintained, a larger percentage of the liquid being evaporated.

With reference to FIGS. 4-7, the present invention provides alternative configurations of the interaction unit 18. As shown diagrammatically in FIGS. 5-7, one or more of the surfaces of the deflector members 28 can be curved. In FIG. 5, each deflector member 28 has a first surface 66, the first surface 66 being concave downwardly and extending upwardly from tangent the wall member 26 outwardly to the apex 40. A second curved surface 68 of the deflector member 28 extends tangent the wall member 26 downwardly and outwardly to the apex 40, the second surface 68 also being concave. The apex 40 has a sharp, blade configuration, the surfaces 66 and 68 extending proximately perpendicular to the wall members 26 at the apex 40. In this configuration, a very high level of turbulence is created in a small region along each of the apexes 40, as long as the distance between the apex 40 is sufficiently close to the facing wall member 26, enhancing the tendency of the liquid to break into tiny droplets at each apex 40. As shown in FIG. 5, the apex angle A represents a limiting angle between the first surface 66 and the second surface 68 at the apex 40. The angle B represents the limiting angular deviation between the wall member 26 below the deflector member 28 and the first surface 66 at the apex 40.

In another alternative configuration of the interaction unit 18, shown in FIG. 6, a second surface 70 of the deflector members 28 extends at right angles to the wall members 26.

Another alternative configuration of the wall members 26 is shown diagrammatically in FIG. 7. The wall members 26 are configured as a series of relatively thin curved segments. The apexes 40 are formed at the intersection of adjacent curved segments of the wall members 26. The space between the wall members 26 form an alternating series of converging chamber portions 72 and diverging chamber portions 74. Each converging chamber portion 72 has an outlet at an associated apex 40, the outlet functioning as an inlet for the immediately adjacent diverging chamber portion 74. In this configuration, maximum turbulence is generated proximate the apexes 40, with a minimum resistance to flow in the space between the successive apexes. This configuration is advantageous in critical scrubbing applications involving hazardous materials such as radioactive particles in the gas.

Figures 17, 18:
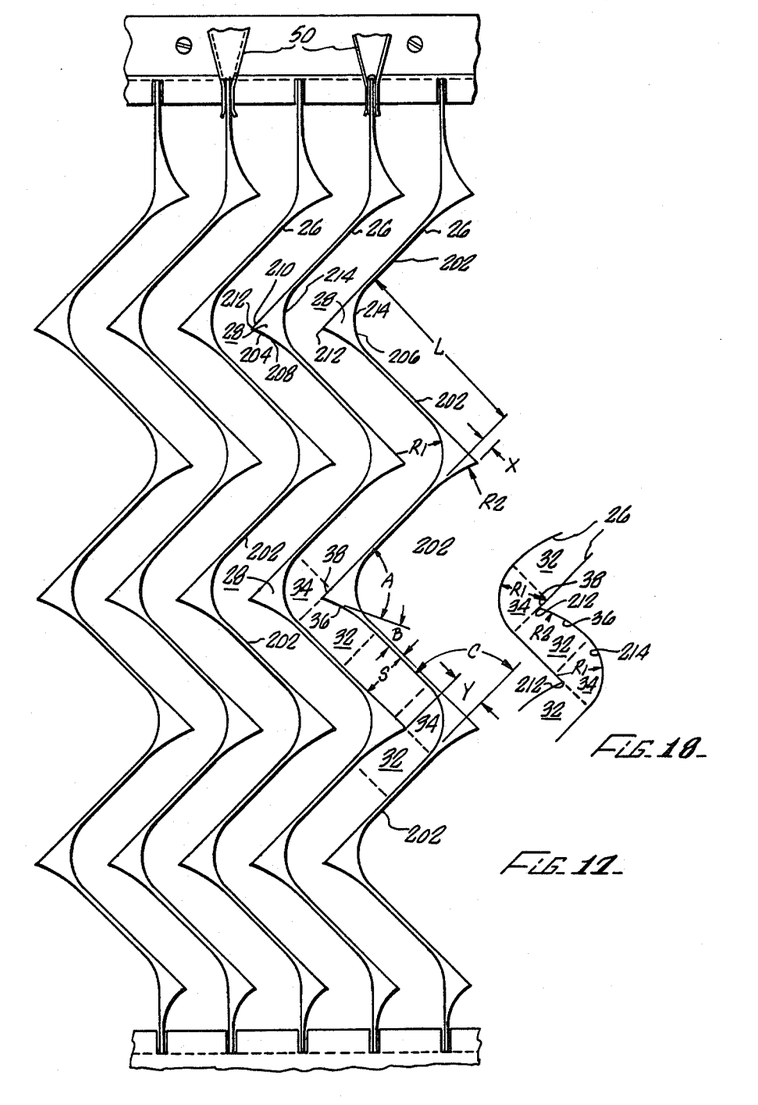
FIG. 17 is a sectional elevational view of another configuration of the structure of FIG. 1 on line 3—3 of FIG. 2.
FIG. 18 is a sectional elevational diagram showing an alternative configuration of the structure of FIG. 17.

With reference to FIGS. 17 and 18, another important configuration of the wall members 26 has alternating horizontally extending segments 202 that are inclined on opposite sides of the generally vertical orientation of the wall members 26. The segments 202 are oriented in parallel with corresponding segments 202 of facing wall members 26, the normal distance between the segments 202 being designated as spacing S in FIG. 17, the segments also having a thickness T, and a length L in the direction of gas flow along segments 202. The deflector members 28 are at junctions of the segments 202, each having a front side 204 and a back side 206, the front sides 204 including the first and second surfaces, designated first surface 208 and second surface 210, an apex 212 being formed along a line joining the surfaces 208 and 210. The back side 206 of each deflector member 28 is formed to provide a concave transition surface 214 that is tangent to adjacent segments 202 of the wall members 26. The first surface 208 of each deflector member 28 is concavely curved, tangentially joining the segment 202 for minimal resistance to gas flow. The second surface 210 is a planar extension of the segment 202 to which it is joined, extending a distance X beyond the plane of the adjoining segment 202.

The converging chamber portions 32 are formed between the first surfaces 208 of a deflector member 28 and the facing wall segment 202. The diverging chamber portions 34 are formed between the second surfaces 210 of a deflector member 28 and the transition surfaces 214 of facing deflector members 28. The transition surfaces 214 of the deflector members 28 can be circularly curved, having a concave radius R1 as shown in FIG. 17. The first surfaces 208 of the deflector members 28 can also be circularly curved, having a radius R2, also shown in FIG. 17. It is to be understood that these surfaces do not have to be circularly curved. They are generally cylindrical in curvature, being generated by a straight line segment that moves parallel to a fixed horizontal reference.

As shown in FIG. 17, the apex angle A is a limiting angle between a segment 202 and the first surface 208 at the apex 212. The angle between the first surface 208 at the apex 212 and the adjoining segment 202 is designated angle B in FIG. 17. Also, the angular deviation between adjoining segments 202 is designated angle C. As depicted approximately to scale in FIG. 17, an exemplary embodiment of this configuration has the segments 202 of length L=about 2.0 inches, spacing S=about 0.5 inch, and thickness T=about 0.040 inch. The angle C is about 90°, the alternating segments 202 being each oriented about 45° from vertical. The apex 212 is located a throat distance Y=0.375 inch from the facing segment 202. The radius R1 is about 0.5 inch and R2 is about 1.5 inches. Also, the angle A is about 63° and angle B is about 27°.

In this configuration, the radius of curvature R1 of the transition surfaces 214 of the deflector members 28 is preferably approximately equal to the spacing S between the adjoining segments 202 and the corresponding segments 202 of the facing wall member 26. This conveniently and effectively provides a smoothly expanding path for the gas in the diverging chamber portions.

As shown in FIG. 18, the transition surface 214 of one deflector 28 directly connects the first surface 208 of the deflector member 28 on an adjacent wall member segment 202, so that the gas flows directly from a diverging chamber portion 34 into the next succeeding converging chamber portion 32. This advantageously provides a very compact arrangement wherein a large number of the deflector members 28 are in a small volume of the chamber 20 for effective gas liquid interaction with minimal resistance to gas flow.

The wall members 26 can be formed from a wide variety of materials, including formed thermosetting urethane, vacuum formed or injection molded PVC, sheet steel or aluminum having a protective surface treatment such as passivation or a protective coating.

In a further and particularly important configuration of the present invention, shown in FIG. 4, at least some of the deflector members 28 are hollow for transporting a fluid proximate the gas without contacting the gas. When the fluid and the gas are at different temperatures, heat flows through the deflector members 28, effecting thermal interaction between the gas and the fluid. The wall members 26 each include a pair of spaced apart side members 76, preferably made from a thin sheet material for efficient heat transfer between the liquid and the gas. The side members 76 are formed to incorporate the hollow deflector members 28. Thus the fluid can move within the wall members 26 from deflector member to deflector member in a direction generally paralleling the direction of gas flow. In an exemplary configuration, the liquid proceeds from an inlet manifold 78, throug an inlet tube 80 and into the wall member 26 at the uppermost of the deflector members 28. The uppermost deflector members 28, being aligned on opposite sides of the wall member 26, provide a generously sized chamber for receiving the liquid from the inlet tube 80. The inlet tube 80 is curved for bypassing the conduit 50 that feeds the wall members 26 of the first configuration 42. Additional inlet tubes 82, not being curved, feed the wall members 26 of the second configuration 44. The inlet tubes 80 are curved at both ends for permitting the inlet tubes 80 and 82 to be connected at uniform intervals along the inlet manifold 78. Similarly, the liquid is collected from the bottoms of the wall members 26 by an outlet manifold 84, the outlet manifold 84 being connected to the lowermost of the deflector members 28 by individual outlet tubes 86 and 88. Since no counterparts of the conduit 50 are located at the bottoms of the wall members 26, the outlet tubes 86 and 88 are straight, differing in length only, the outlet tubes 86 connecting the wall members 26 of the first configuration 42, the outlet tubes 88 connecting the wall members 26 of the second configuration 44. It should be understood that the direction of fluid flow in the wall members 26 can be reversed. Indeed, in some applications it is preferred to have the fluid flow upwardly in the wall members 26, in the same direction as the gas flow.

The configuration of the interaction unit 18 shown in FIG. 4 has a variety of uses. In an exemplary condenser application, the fluid that is circulated within the wall members 26 is the fluid to be condensed. The fluid that is introduced between the wall members 26 from the conduits 50 can be a cooling liquid, such as water. In another application, the gas is a hot gas, such as the exhaust of a combustion process, and the liquid within the wall members 26 is heated by the gas. Thus the present invention provides an effective heat exchanger for a boiler or industrial hot water heater.

The side members 76 are preferably fabricated from a thin material having high heat transfer characteristics, such as copper. Alternatively, where corrosion would be encountered, the side members can be fabricated from corrosion-resistant steel.

As shown in FIG. 1, the interaction unit 18 is located immediately above a diffusion unit 90, the diffusion unit 90 promoting an even distribution of gas flow in the interaction unit 18, and collecting liquid that falls from the bottom of the interaction unit 18. The diffusion unit 90, more clearly shown in FIG. 8, forms another module of the housing 12, having opposite side segments 92 forming part of the side walls 14 and end segments 94. A parallel array of collection troughs 96 are spaced between the end segments 94, each of the troughs extending from one of the side segments 92 to proximate the opposite side segment 92, being connected to a discharge manifold 98 that is attached to the inside of one end wall 16 of the housing 12. The troughs 96 are thus oriented crosswise to the wall members 26 of the interaction unit 18, thereby avoiding a need to consider coordinating the spacing of the channels 100 with the spacing of the wall members 26. A plurality of vertically oriented channels 100 for the gas are thus formed in the spaces between the troughs 96. The troughs 96 are V-shaped on the bottom for presenting minimal resistance to upward flow of the gas within the channels 100. Also, the bottoms of the troughs 96 slope slightly downwardly toward the discharge manifold 96 for draining the liquid into the manifold 98. A comb panel 101 forms a part of the discharge manifold, sealingly connecting the troughs 96 for preventing the gas from entering the manifold 98 from the channels 100. The comb panel 101 slopes upwardly toward the side segment 92 for permitting the tops of the channels 100 to extend substantially the full distance between the side segments 92.

Figure 8:
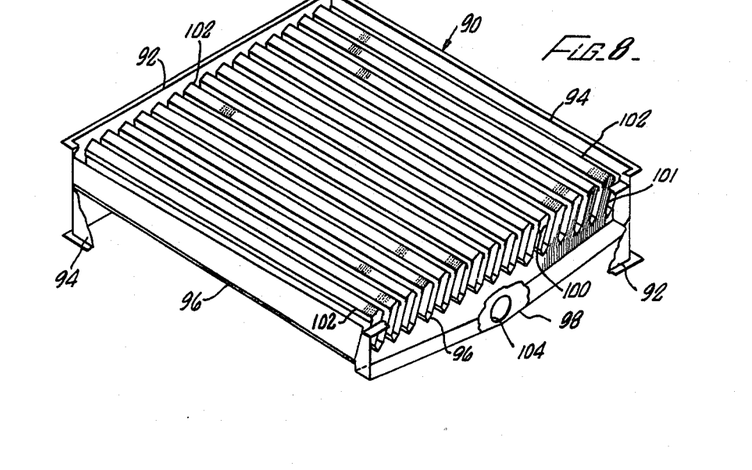
FIG. 8 is a fragmentary perspective elevational view of the structure of FIG. 1 within region 8 of FIG. 1.

A sloping screen strip 102, formed of a perforated sheet material, extends lengthwise over each of the channels 100 for deflecting the falling liquid laterally from the channels 100 into the troughs 96. As shown in FIG. 8, the screen strips 102 have inverted V-shaped lateral cross sections for symmetrically deflecting the liquid to opposite sides of the channels 100. The screen strips 102 provide a localized high velocity gas flow that prevents the liquid from falling downwardly through the openings of the screen strips 102; the strips 102 also provide an evenly distributed flow of the gas into the interaction unit 18 by providing localized restrictions that tend to choke off excessive local gas flow velocities. Further, the screen strips 102 tend to break the falling liquid into a multitude of tiny droplets that mix with and interact with the gas in addition to the interaction that is produced by the interaction unit 18. The perforations of the screen strips 102 can be from about 0.06 inch to about 0.18 inch in diameter, and are typically about 0.12 inch in diameter. Preferably the screen strips 102 have a free opening approximately equal to the plan opening area of the channels 100. This advantageously provides only a slight restriction to gas flow based on the edge effects of the individual perforations. Thus an additional purpose for the inverted V-shaped cross-sectional shapes of the screen strips 102 is that the total surface area of the screen strips 102 is thus substantially greater than the plan cross-sectional area of the channels 100 for allowing the desired amount of free opening area. A discharge outlet 104 is connected from the discharge manifold 98 through the adjacent side segment 92. From the outlet 104, the liquid circulates in a contact liquid path, schematically designated as 106 in FIG. 1, to a contact liquid feeder 108 that is connected to each of the manifold fittings 60, providing the contact liquid to the conduit 50 through the manifolds 58 as described above. The contact liquid path 106 conventionally provides pumping, filtration, and monitoring of the contact liquid as well as replenishing that portion thereof that is lost to the gas by evaporation.

Figures 8, 9:
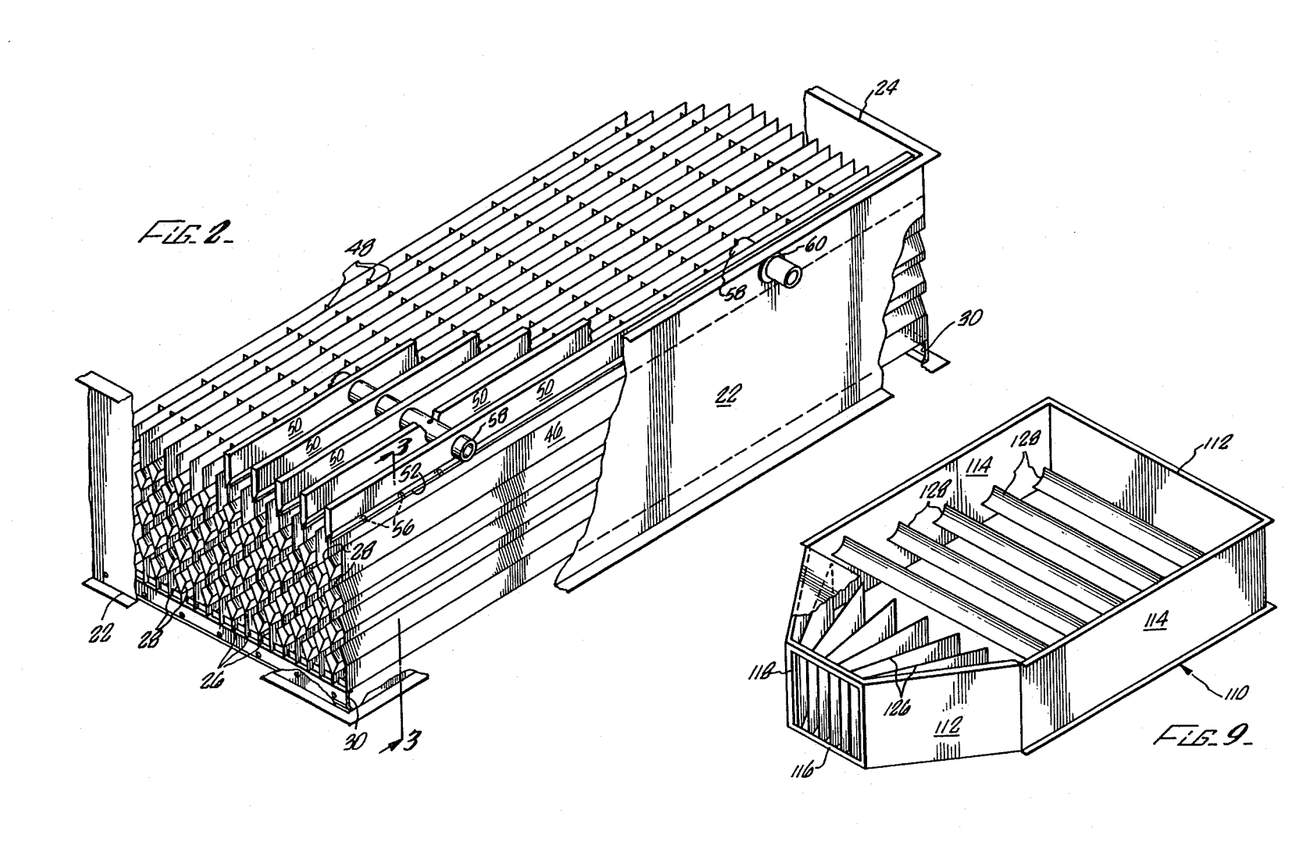
FIG. 9 is a fragmentary perspective elevational view of the structure of FIG. 1 within region 9 of FIG. 1.

With reference to FIGS. 1 and 9, a deflection unit 110 forms a modular part of the housing 12 under the diffusion unit 90. The deflection unit 110 has opposite side segments 112 corresponding to the side walls 14 of the housing, and end segments 114 corresponding the to the end walls 16 of the housing 12. One of the side segments 112 extends laterally outwardly from the housing 12, forming a horizontal inlet chamber 116 having an inlet 118 for blower means 120, the blower means 120 being depicted in FIG. 1 as a downwardly directed blower 122 and an elbow duct 124 connected between the blower 122 and the inlet 118. Within the horizontal inlet chamber 116 are a plurality of vertically oriented spreader vanes for horizontally spreading the flow of gas from the inlet 118 into the housing 12. The spreader vanes 126 extend from the inlet 118, where they are relatively closely spaced horizontally. The spreader vanes 126 extend across the horizontal inlet chamber, ending proximate the plane of the side wall 14, the vanes 126 diverging from the inlet 18 for spreading the gas flow horizontally uniformly between the end segments 114 of the deflection unit 110. The space between the end segments 114 of the deflection unit 110 functions as a deflection chamber wherein the gas is redirected from a horizontal flow direction to a upwardly vertical flow direction. For this purpose, a plurality of horizontally disposed deflection vanes 128 extend between the opposite end segments 114. The deflection vanes 128 are concave upwardly, being spaced approximately uniformly on a downwardly sloping line 129, the line 129 extending from proximate the top of the horizontal inlet chamber 116 to the bottom of the opposite side segment 112.

Figures 10, 15, 16:
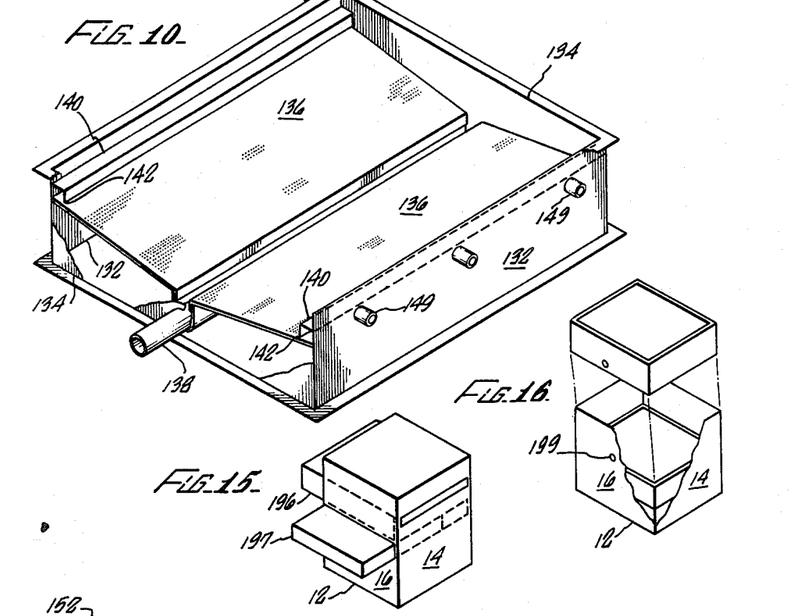
FIG. 10 is a fragmentary perspective elevational view of the structure of FIG. 1 within region 10 of FIG. 1.
FIG. 15 is a perspective diagram showing an alternative configuration of the structure of FIG. 1.
FIG. 16 is a perspective diagram showing another alternative configuration of the structure of FIG. 1.

As shown in FIGS. 1 and 10, the housing 12 includes a rinse unit 130 when the structure 10 is used for scrubbing impurities from the gas. When the present invention is used for scrubbing the gas, the contact liquid preferably includes a soap-like material for producing a large multiplicity of bubbles within the interaction unit 18, the bubbles providing an extremely large surface area in addition to the area of the small liquid droplets that are produced in the contact liquid as described above, thereby facilitating the removal of impurities from the gas. A soap-like material suitable for this purpose is a general purpose cleaner, designated LOC, that is available from Amway Corp., Ada, Mich. In this application, a small amount of the contact liquid including some of the soap-like material, along with impurities from the gas, is carried upwardly as mist from the interaction unit 18. A rinse liquid such as clear water is circulated in the rinse unit 130 for preventing the soap-like material and the impurities from escaping the structure 10.

The rinse unit 130 forms another module of the housing 12, having opposite side segments 132 corresponding to the side wall 14, and end segments 134 corresponding to the end walls 16 of the housing 12. A pair of rinse panels 136 extend inwardly and slightly downwardly from the side segments 132, emptying into a rinse drain 138 that extends between the end segments 134. A rinse conduit 140 extends along each side segment 132 immediately above the respective rinse panel 136 for introducing a sheet of the rinse liquid to the rinse panels 136. For this purpose, a rinse slot 142 is formed between the top of each rinse panel 136 and a wall edge portion of the rinse conduit 140. Each rinse panel 136 is perforated with a multiplicity of small holes except for the portions thereof located close to the rinse conduits 140. Thus the rinse liquid, flowing from the rinse slots 142, becomes increasingly uniform in thickness in the space between the rinse conduit 140 and the perforate region of the rinse panels 136.

The gas, flowing upwardly in the rinse unit 130, produces a localized high velocity, turbulent flow pattern above the rinse panels 136 by virtue of passing through the small perforations. The rinse liquid, encountering this high velocity, turbulent flow, is broken up into a multitude of small droplets, mixing with the gas, and absorbing the mist that rises from the interaction unit 18. The soap-like material and the impurities are thus carried into the rinse drain 138 and circulated in a conventional rinse liquid path 146 to a rinse feeder 148, the rinse feeder 148 being connected to the rinse conduits 140 through a plurality of rinse fittings 149. The rinse liquid path 146 includes conventional filter means, pump means, and means for replenishing the rinse liquid that is lost to evaporation and drift.

The tower structure 10 is equipped with a conventional mist or drift eliminator 150 at the top of the housing 12. The gas, having interacted with the liquid as described above, leaves the tower structure through an exhaust opening 152.

Figure 11:
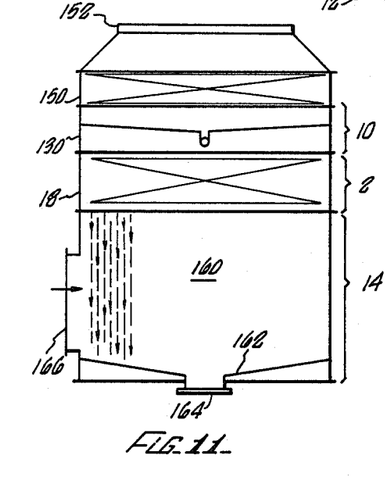
FIG. 11 is a fragmentary sectional elevational view of an alternative configuration of the tower structure of FIG. 1.

With further reference to FIG. 11, an alternative configuration of the tower structure 10 of the present invention includes the interaction unit 18, the rinse unit 130, and the drift eliminator 150 as described above. A rain chamber 160, located under the interaction unit 18, receives the excess contact liquid falling therefrom. The rain chamber 160 has a sloping false bottom 162 for collecting the contact liquid and directing it to a drain 164, from which the contact liquid is recirculated to the interaction unit 18 as described above. The rain chamber 160 has an inlet 166 for horizontally receiving the gas from the blower means 120. The gas, entering horizontally from the inlet 166 contacts and interacts with the falling liquid in the rain chamber 160. This interaction advantageously tends to evenly distribute the gas flow as it is redirected upwardly to the interaction unit 18 for evenly distributing the flow of gas within the interaction unit 18. The rain chamber 160 is particularly advantageous in the present invention for removing excessive heat from the gas in scrubber applications, avoiding a need for high-temperature materials in the interaction unit 18. Also, the rain chamber 160 is effective in removing fly-ash that may be present in the gas.

Figure 14:
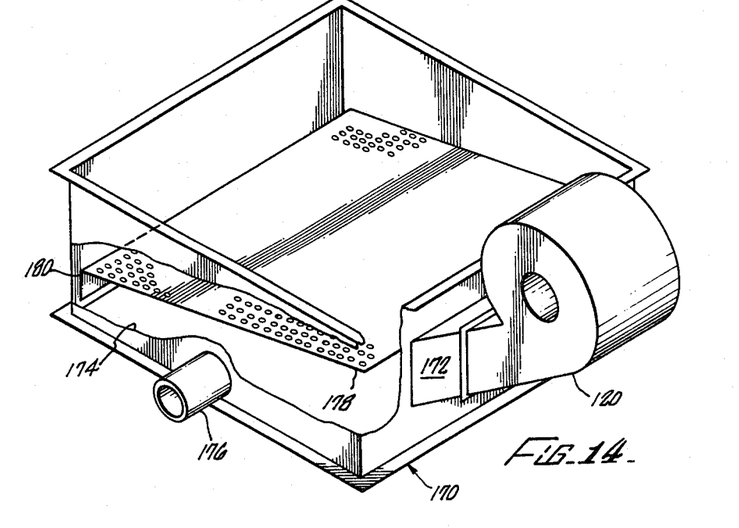
FIG. 14 is a fragmentary perspective elevational view of an alternative configuration of the structure of FIG. 11 within region 14 of FIG. 11.

In another alternative configuration of the tower 10 for scrubber applications, a diffusion unit 170, shown in FIG. 14, replaces the rain chamber 160. The diffusion chamber 170 has a downwardly sloping gas inlet 172 at one side thereof, the gas inlet 172 being fed from the blower means 120. The bottom of the diffusion chamber 170 forms a tank 174 for collecting the liquid from the interaction unit 18, the tank 174 having a drain 176 for connecting to the contact liquid path 106, described above. A perforate diffusion panel 178 extends across the diffusion chamber 170 from proximate the top of the gas inlet 172, downwardly sloping toward the opposite side of the diffusion chamber 170, the diffusion panel 178 having a vertically depending flange 180, the flange 180 being spaced away from the side of the diffusion chamber 170 and normally extending below the level of the liquid in the tank.

A positive pressure of the gas is produced in the diffusion chamber 170 below the diffusion panel 178 by the blower means 120, causing localized high velocity upward gas flow through the perforations thereof. The falling liquid interacts with the upwardly flowing gas, breaking the liquid into small droplets and mixing the liquid with the gas above the diffusion plate 178, the high velocity gas flow upward preventing downward passage of the liquid through the perforations of the diffusion plate 178. The liquid that does not evaporate in the gas gradually migrates laterally and downwardly toward the flange 180, falling from there into the tank 174. The liquid, thus separated from the gas, passes through the drain 176 into the contact liquid path 106.

Figure 12:
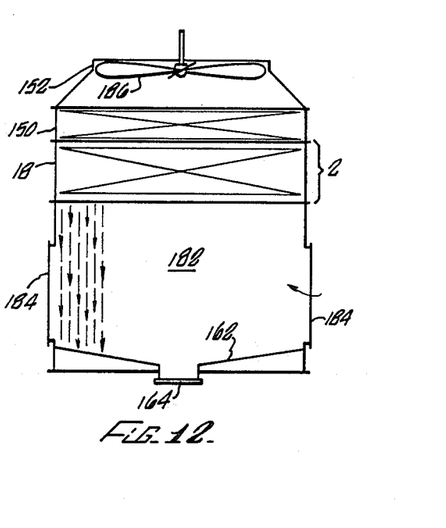
FIG. 12 is a fragmentary sectional elevational view of another alternative configuration of the tower structure of FIG. 1.

With reference to FIG. 12, another alternative configuration of the tower structure 12 includes the interaction unit 18, the drift eliminator 150, and a rain chamber 182. The rain chamber 182, otherwise similar to the rain chamber 160, has a pair of inlets 184 at opposite sides thereof for receiving the gas at atmospheric pressure. Fan means 186 at the exhaust opening 152 of the tower structure 10 produces an induced draft of the gas upwardly in the housing 12 from the rain chamber 182. The configuration shown in FIG. 12 is exemplary of a straight cooling tower application of the present invention not having the rinse unit 130.

Figure 13:
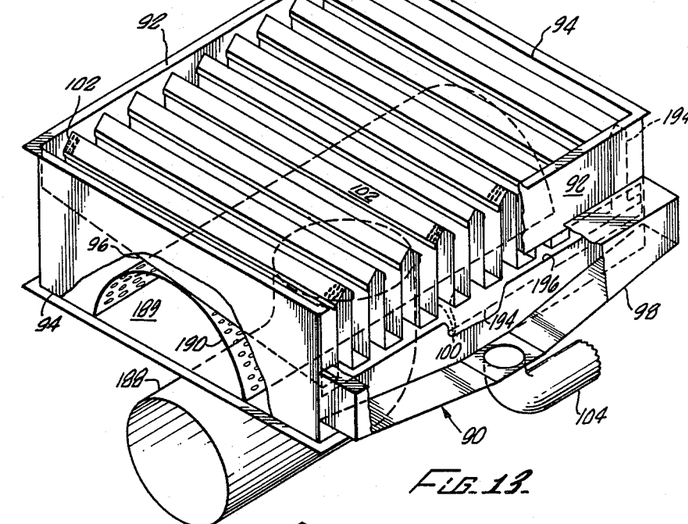
FIG. 13 is a fragmentary perspective elevational view of an alternative configuration of the structure of FIG. 1 within region 8 of FIG. 1.

With reference to FIG. 13, another alternative configuration of the diffusion unit 90 provides a gas inlet duct 188 for directing the gas upwardly into the housing 12 through a bottom wall 189 thereof, a perforate diffusion sheet 190 being interposed between the inlet duct 188 and the bottoms of the channels 100. As shown in FIG. 13, the distribution sheet 190 is curved, forming a cylindrical segment extending between the end segments 94, curving upwardly from the bottom wall 189 at opposite sides of the inlet duct 188. In this configuration of the diffusion unit 90, all of the gas must flow through two perforate sheets, the distribution sheet 190, and one of the screen strips 102, for further enhancing the uniformity of gas flow upwardly from the diffusion unit 90 into the interaction unit 18.

In the configuration of the diffusion unit 90 shown in FIG. 13, the discharge manifold 98 is located external to the housing 12, being fed through a slot 192 in one of the side segments 92. A comb panel 194, sealingly connecting the troughs 96, partially covers the slot 192, being sealingly joined to the side segment 92 for directing the liquid into the manifold without permitting escape of the gas into the manifold. Also, as an alternative of the V-shaped bottoms of the troughs 96, the troughs 96 have flat bottoms for ease of fabrication of the sealed connection to the comb panel 194.

With reference to FIG. 15, an alternative modular form of the construction of the housing 12 provides modular units in the form of trays 196 and 197 that slide horizontally into the housing 12. As shown in FIG. 15, the trays 196 and 197 enter the housing 12 from a plurality of directions for facilitating accommodation of the various conduit drains, etc. described above.

In another alternative of the modular construction of the housing 12, the side walls 14 and end walls 16 define a cavity within which the modules are stacked. Appropriate openings, such as opening 199, are provided in the side walls 14 and end walls 16 for alignment with corresponding module connections of the modules.

The present invention provides a highly versatile tower structure that is efficient and cost-effective in a variety of applications. The high degree of liquid turbulence with minimal restriction to gas flow in the gas liquid contact configurations described above permits the physical size of the tower structure 10 to be significantly reduced for a given tonnage of capacity. It is expected, for example, that the structure 10, in a configuration measuring 4 ft. high, 4 ft. long, and 4 ft. wide, will have at least as much capacity as a conventional tower that is at least 6 ft. high, 6 ft. long, and 5 ft. wide. The volume of the tower structure 10 of the present invention is only 35% of the volume of the conventional tower in this comparison. Also, it is expected that the cost of manufacturing the tower structure 10 according to the present invention, per unit volume, is about the same as for conventional tower construction. Accordingly, it is expected that the tower structure 10 of the present invention is substantially less expensive to produce than a conventional tower of equivalent capacity. Even if the fabrication costs of the structure 10 are found to be somewhat higher per unit of volume than for conventional construction, an overall cost savings is still possible unless those cost are in excess of three times the conventional costs per unit volume. Moreover, the costs for transporting and installing the structure 10 are substantially reduced below what is conventionally required, because the volume and load capacity of the transporting means and the application situs are less than conventional requirements.

Another advantage of the present invention is that the interaction unit 18, in a single basic configuration, is effective in a great variety of applications. This is true for at least the reason that the configuration shown in FIG. 4 is effective for cooling a liquid in contact with a gas, for heating a liquid not in contact with a gas, for condensing a liquid, and for scrubbing impurities from the gas, in addition to providing several useful combinations of these functions.

Although the present invention has been described in considerable detail with reference to certain preferred versions thereof, other versions are possible. Therefore, the spirit and scope of the appended claims should not necessarily be limited to the description of the preferred versions thereof.

What is claimed is:

1. A gas liquid tower structure comprising:
   (a) a plurality of spaced parallel wall members in a chamber, facing surfaces of the wall members having a staggered array of deflector members protruding therefrom in parallel relation for producing rolling turbulence in a flow of gas moving between the wall members generally perpendicular to the deflectors, wherein the space between facing wall members, including the deflector members, forms a series of converging and diverging channel portions, each channel portion having an inlet and an outlet, the inlet of a diverging channel portion being offset laterally toward a first one of the wall members, the outlet of a converging channel portion that is fed directly by the diverging channel portion being offset laterally toward the facing wall member, and
   (b) means for transporting a fluid through the chamber for interaction with the gas,
   wherein at least some of the deflector members have first and second surfaces, the first surface for defining one side of a converging channel portion, the second surface for defining one side of a diverging chamber portion, the first and second surfaces meeting at a deflector apex, the apex having an included angle within the deflector member, the angle being less than 180°, and
   wherein the wall members comprise alternating wall segments, the segments being inclined on opposite sides of a general direction of movement of the gas in parallel relation to corresponding segments of facing wall members, the deflector members being located at junctions of the segments and having front and back sides, the front sides including the first and second surfaces, the back sides forming concave transistion surfaces between adjacent segments of the wall members, the first surface of each deflector member being concavely curved and the second surface forming a planar extension of the wall member segment to which it is joined, the diverging chamber portions being formed between the second surfaces and the transition surfaces of facing deflector members, the transition surfaces having a radius of curvature approximately equal to the normal spacing between the adjoining segments and the corresponding facing segments.

2. A gas liquid tower structure comprising:
   (a) a plurality of spaced parallel wall members in a chamber, facing surfaces of the wall members having a staggered array of deflector members protruding therefrom in parallel relation for producing rolling turbulence in a flow of gas moving between the wall members generally perpendicular to the deflectors, wherein the space between facing wall members, including the deflector members, forms a series of converging and diverging channel portions, each channel portion having an inlet and an outlet, the inlet of a diverging channel portion being offset laterally toward a first one of the wall members, the outlet of a converging channel portion that is fed directly by the diverging channel portion being offset laterally toward the facing wall member, and (b) means for transporting a fluid through the chamber for interaction with the gas, wherein at least some of the deflector members have first and second surfaces, the first surface for defining one side of a converging channel portion, the second surface for defining one side of a diverging chamber portion, the first and second surfaces meeting at a deflector apex, the apex having an included angle within the deflector member, the angle being less than 180°, and wherein the wall members comprise alternating wall segments, the segments being inclined on opposite sides of a general direction of movement of the gas in parallel relation to corresponding segments of facing wall members, the deflector members being located at junctions of the segments and having front and back sides, the front sides including the first and second surfaces, the back sides forming concave transistion surfaces between adjacent segments of the wall members.

3. The structure of claim 2 wherein the angle is between about 60° and about 135°.

4. The structure of claim 3 wherein the angle is about 63°.

5. The structure of claim 2 wherein the fluid is a first liquid, the first liquid passing between the wall members for contacting the gas.

6. The structure of claim 5 wherein the chamber includes an inlet for the gas and an outlet for the gas, the structure being adapted for transporting the first liquid generally from proximate the outlet for the gas toward the inlet for the gas.

7. A gas liquid tower structure comprising:

(a) a chamber including an inlet for the gas and an outlet for the gas, the outlet being located above the inlet;

(b) a plurality of spaced vertically extending parallel wall members in the chamber, facing surfaces of the wall members having a staggered array of horizontally extending deflector members protruding therefrom for producing rolling turbulence in a flow of gas moving upwardly between the wall members generally perpendicular to the deflectors; and (c) means for transporting a first liquid generally downwardly from proximate the tops of the wall members toward the bottoms of the wall members in contact with the gas for interaction with the gas, wherein at least some of the deflector members on facing wall members have first and second surfaces, the first surface for defining one side of a converging channel portion, the second surface for defining one side of a diverging chamber portion, the first and second surfaces meeting at a deflector apex, the apex having an included angle within the deflector member, the angle being less than 180°, and wherein the wall members comprise alternating wall segments, the segments being inclined on opposite sides of vertical in parallel relation to corresponding segments of facing wall members, the deflector members being located at junctions of the segments and having front and back sides, the front sides including the first and second surfaces, the back sides forming concave transistion surfaces between adjacent segments of the wall members.

8. The structure of claim 7 wherein the first surface of each deflector member is concavely curved and the second surface is a planar extension of the wall member segment to which it is joined.

9. The structure of claim 7 wherein the diverging chamber portions are formed between the second surfaces and the transition surfaces of facing deflector members.

10. The structure of claim 7 wherein the transition surfaces of the deflector members have a radius of curvature approximately equal to the normal spacing between the adjoining segments and the corresponding facing segments.

11. The structure of claim 7 wherein the transition surface of the deflector is directly connected to the first surface of the deflector on an adjacent wall member segment whereby gas flows directly from a diverging chamber portion into the next succeeding converging chamber portion.

12. The structure of claim 7 wherein the angular deviation between adjoining wall segments is aproximately 90°.

13. The structure of claim 7 wherein the angle is between about 60° and about 135°.

14. The structure of claim 13 wherein the angle is about 63°.

15. The structure of claim 7 wherein the wall members are spaced apart whereby, in the absence of air flow, the liquid drops from the apex of a deflector member and impinges on a facing wall member.

16. The structure of claim 7 wherein upwardly directed air flow is deflected laterally and upwardly by the first surface of the deflector members, directly intersecting a film of the liquid flowing laterally from second surface for breaking the liquid into very small droplets, thereby generating a large surface area of the liquid in contact with the gas.

17. The structure of claim 7 wherein the first surfaces of at least some of the deflector members are concavely curved for producing a rolling turbulence of the gas proximate the apex of each of the deflector members having the curved surfaces.

18. The structure of claim 7 further comprising separator means for confining the gas between a pair of facing wall members in a plurality of channel segments, thereby preventing lateral flow of the gas in a direction parallel to the deflector members.

19. The structure of claim 18 wherein the separator means comprises a plurality of spaced apart web members, the web members extending vertically between adjacent wall members and joining the wall members along and between at least two each of the deflector members of facing wall members.

20. The tower structure of claim 7 wherein the chamber is a main chamber, the wall members being in a first portion thereof, the structure further comprising:

(a) a lower chamber having a side entrance for the gas; and
(b) means for permitting liquid from the main chamber to fall through the lower chamber; and
(c) means for collecting the liquid that falls through to the bottom of the lower chamber.

21. The tower structure of claim 20 further comprising fan means for drawing the gas into the main chamber from the lower chamber.

22. The tower structure of claim 7 wherein the wall members are in a first portion of the chamber and the liquid is a first liquid for scrubbing impurities from the gas, the structure further comprising:
(a) a slightly sloping partition member covering a second portion of the chamber above the first portion, the partition member having a lower perforated region for permitting the gas to pass therethrough, and an upper unperforated region for receiving and spreading a film of rinsing liquid and directing the rinsing liquid onto the perforated portion; and
(b) means for collecting excess liquid from the top surface of the partition member without requiring the liquid to flow through the perforated portion.

23. The tower structure of claim 22 wherein the scrubbing fluid contains a soap-like material for generating a large multiplicity of bubbles that provide a very large surface area in which the gas impinges for improving the ability of the fluid to collect the impurities from the gas.

24. The structure of claim 23 wherein the first liquid comprises LOC general purpose cleaner.

25. The structure of claim 7 further comprising distribution means for admitting the first liquid proximate the tops of the wall members.

26. The structure of claim 25 wherein the distribution means comprises:
(a) means for directing a sheet of the liquid onto at least some of the wall members; and
(b) manifold means for feeding the directing means.

27. The structure of claim 26 wherein the directing means extends substantially the length of the tops of the wall members for producing the sheet of liquid substantially over the full length of the sides of the wall members.

28. The structure of claim 26 further comprising a manifold system for directing the liquid into the directing means in a parallel-connected grid configuration for equalizing the pressure distribution of the liquid from the directing means.

29. The structure of claim 26 wherein the directing means comprises:
(a) a V-shaped member having an elongate opening at the bottom for receiving the top of a wall member; and
(b) means for spacing the sides of the opening a predetermined distance away from the wall member.

30. The structure of claim 29 wherein the spacing means of the directing means comprises a plurality of slot spacer members, each slot spacer member contacting opposite sides of the opening and extending over the top of the wall member for support thereby, the slot spacer members being disposed at intervals along the wall member.

* * * * *